Nov. 1, 1966　　　　P. V. SNYDER　　　　3,283,128
ELECTRIC TOASTER HEATING UNIT
Filed Nov. 18, 1963　　　　　　　　　　2 Sheets-Sheet 1

Inventor:
Paul V. Snyder
by Laurence R. Tempo
His Attorney

Nov. 1, 1966   P. V. SNYDER   3,283,128
ELECTRIC TOASTER HEATING UNIT
Filed Nov. 18, 1963   2 Sheets-Sheet 2

Inventor:
Paul V. Snyder,
by Laurence R. Kempton
His Attorney

United States Patent Office 3,283,128
Patented Nov. 1, 1966

3,283,128
ELECTRIC TOASTER HEATING UNIT
Paul V. Snyder, Fullerton, Pa., assignor to General Electric Company, a corporation of New York
Filed Nov. 18, 1963, Ser. No. 324,311
7 Claims. (Cl. 219—532)

This invention relates to electric toasting apparatus and more specifically to a heating unit primarily suited for use in the well known pop-up style toaster.

Although there are many different types of toasters and toaster heating units shown in the prior toasting art, the type which enjoys the most commercial success is the pop-up style toaster employing a separate heating unit for each side of a bread receiving toasting well. The majority of such toasters incorporate two toasting wells and thus employ four heating units. Thus, it will be appreciated that in view of the large number of toasters currently being manufactured any improvements which can be made in the cost of fabrication or assembly are highly desirable.

Accordingly, it is a primary object of this invention to provide an improved low cost electrical heating unit for an electric toaster or similar appliance.

It is a further object of the invention to provide an improved toaster heating unit which is made from relatively inexpensive materials and which requires a minimum of material.

It is another object of this invention to provide an electrical heating unit that can be easily manufactured and that lends itself to automated manufacturing techniques.

It is another object of this invention to provide a versatile toaster heating unit which may be made in strip form and cut to the desired length to accommodate the various sized toasters.

Another object of the invention is to provide an improved low cost method of making a heating unit suitable for use in an electric toaster.

In perhaps its simplest form, the heating unit of the invention includes a relatively stiff resistance heating wire formed into a sinous series of loops which are secured at their ends to an elongated support strip of insulation material such as asbestos. A plurality of metallic eyelets serve as rivets to secure the lower end of each loop to the support strip with the major portions of the loops extending away from the strip. The resulting heating unit may be simply mounted into a toaster by conducting supporting members extending through the end eyelets.

As another embodiment of the invention, the heating unit further includes an upper support member carrying a sheet of insulation, such as asbestos paper and extending in the area of the heating wire loops. A suitable arrangement is provided to maintain the loops of the resistance wire in surface contact or close proximity with the sheet of insulation material. The use of the sheet of insulation material eliminates the need for any highly reflective surfaces adjacent the heating wire and also permits satisfactory single slice toasting in a toaster having more than one toasting well in side by side relation. Incorporating the upper portion of the heating unit provides a stronger construction while yet allowing for thermal expansion of the heating wire.

Further features, objects and attendant advantages will become apparent by reference to the following detailed description taken in connection with the accompanying drawings in which.

Figure 1:
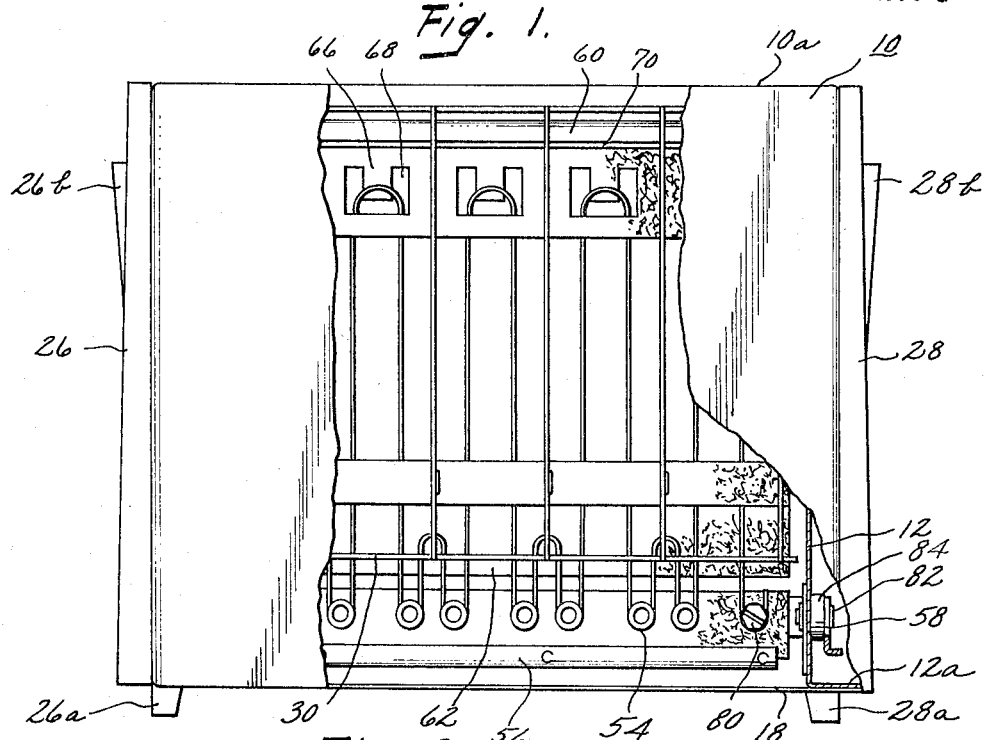
FIG. 1 is a side elevational view of a toaster partially cut away on lines 1—1 of FIG. 2 to show the heating unit of the invention.
Figures 2, 3:
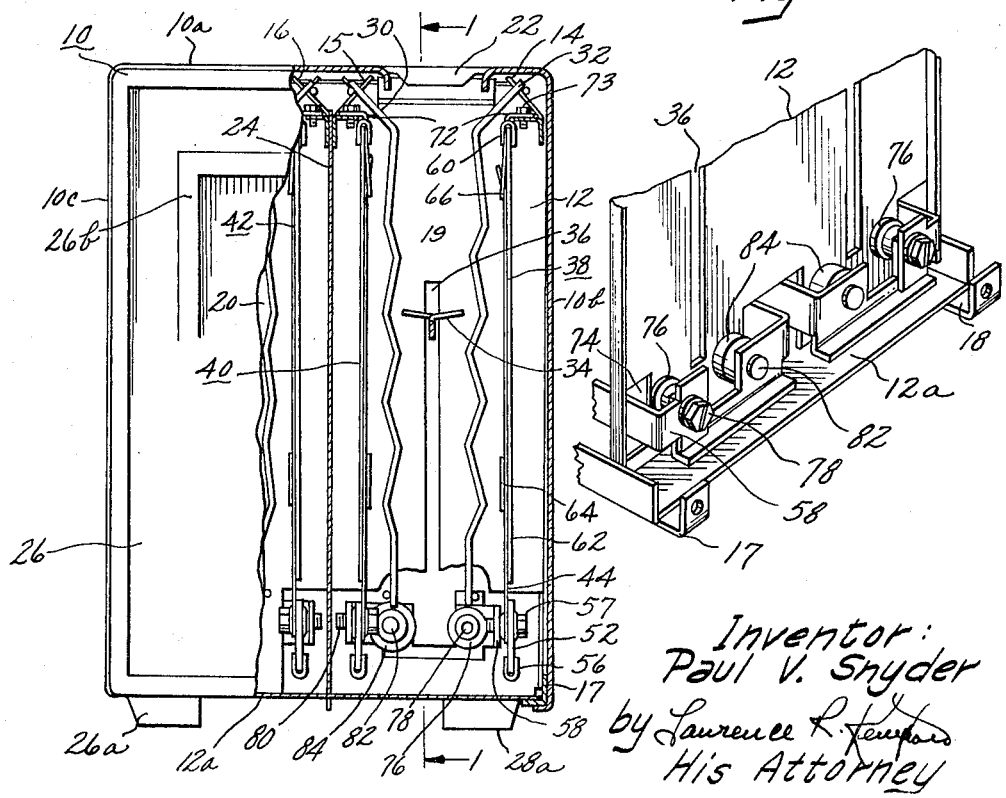
FIG. 2 is an end elevational view of the toaster of FIG. 1 also partially cut away to show the internal components of the toaster.
FIG. 3 is a perspective view of the lower portion of one end of the toaster of FIGS. 1 and 2.

Turning now to the drawings, and first particularly to FIGS. 1, 2 and 3, there is shown a toaster including an outer shell 10, illustrated as a U-shaped metal stamping forming a top wall 10a and front and rear side walls 10b and 10c. The shell 10 fits over a metal support structure including a pair of end plates, one of which is shown at 12 and a plurality of upper supporting ribs 14, 15 and 16 and lower ribs 17 and 18 extending between the end plates. The end plates may be L-shaped to form bottom wall portions as represented by the numeral 12a.

The toaster may be provided with the number of toasting chambers or wells desired with the conventional arrangement being two chambers 19 and 20 positioned in side by side relation. The outer shell 10 is provided with bread receiving slots, one of which is shown at 22 in top wall 10a to cooperate with the toasting chambers. The toasting chambers may be separated by a metal support plate 24 connected to the top support ribs 15 and 16 and to bottom wall 12a. The plate is desirable in a four slice version of the toaster, but is not necessary in the two-slice model.

The outer shell 10 and the support structure further cooperates with plastic end members 26 and 28. Each member is formed with integral supporting legs as shown at 26a and 28a, and further provided with an integral handle 26b and 28b. A bottom wall (not shown) cooperates with the end members 26 and 28 and the bottom portions of the end walls to form a crumb tray pivotally supported to be manually opened and closed for removing crumbs as needed.

Each toasting chamber includes a pair of wire guides 30 and 32 for positioning the bread. A bread carrying member 34 extends through an elongated slot 36 in end wall 12. It should be understood that the toaster also includes additional components forming the carriage mechanism and control components for obtaining automatic operation of the carriage mechanism and for controlling the duration of the toasting cycle. However, since these components do not form a portion of the invention, they have not been shown on the drawings, it being understood that conventional arrangements may be employed.

As previously indicated, this invention relates primarily to the toaster heating units. Since a heating unit is required for each side of the bread slice to be toasted, the two toasting chambers or wells shown in FIG. 2 require four heating units, three of which are shown at 38, 40 and 42. These heating units are supported by the supporting ribs 14, 15 and 16 and end wall 12 within the toaster in a manner to be later described in greater detail.

Figure 4:
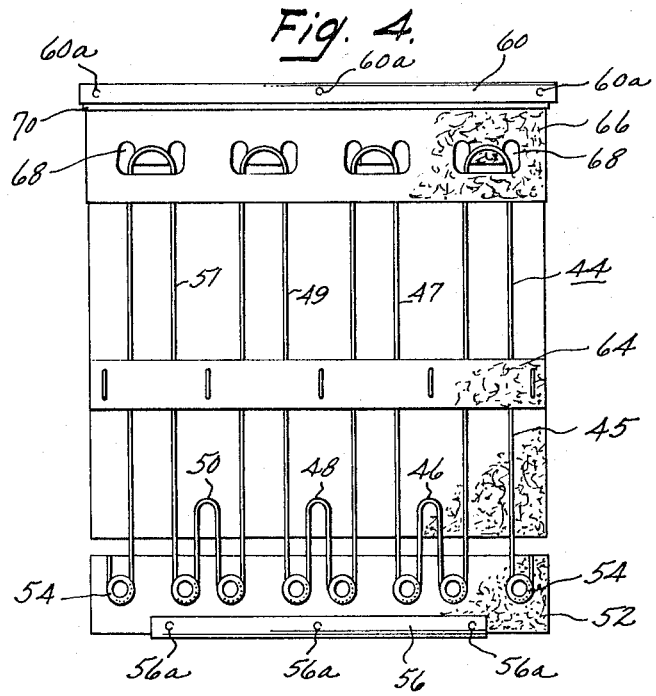
FIG. 4 is a side elevational view of the toaster heating unit of the invention.
Figure 5:
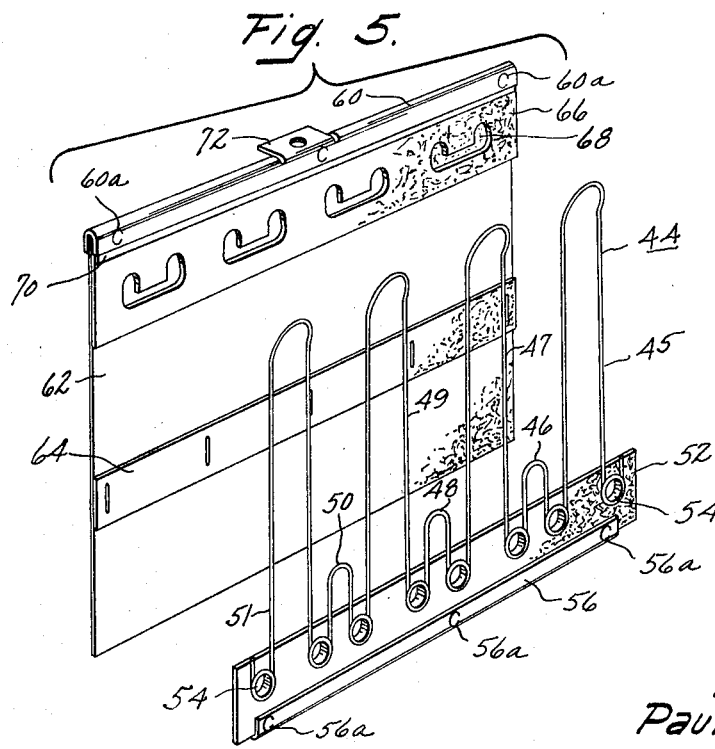
FIG. 5 is an exploded perspective view of the heating unit of FIG. 4.

Referring now to FIGS. 4 and 5, the heating unit of the invention may be seen to include a relatively stiff resistance heating wire 44 formed into a sinuous series of loops 45 through 51. In its simplest arrangement, the loops are formed in substantially a single plane and include vertically extending portions connected by upper and lower bend portions. Main heating loops 45, 47, 49 and 51 extend upwardly to a height roughly comparable to that of a conventional slice of bread. Alternate loops 46, 48 and 50 extend upwardly less than one-third of the height of the main heating loops. Utilizing the shorter loops near the base of the heating unit in conjunction with the full sized loops produces a uniform toasting pattern. If only full sized loops were employed, the toast would be darker at the top than at the bottom due to convection heat.

The open ends of each loop, or more specifically, the lower bend portions connecting adjacent vertical loop portions, are securely attached to a relatively stiff strip 52 of heat insulating material by means of metallic eyelets 54 which are riveted or eyeleted to the strip. As can be seen from FIGS. 4 and 5, the major portions of the loops extend upwardly away from strip 52. Since asbestos is one of the better heat insulating materials while yet being a fair electrical insulator and relatively inexpensive, it is preferable that strip 52 be made of asbestos. However, since asbestos is not extremely rigid or durable, a U-shaped metallic stiffening member 56 is positioned on the lower edge of strip 52 to strengthen the heating unit. The strip 52 may be secured to member 56 by some suitable means such as dimpling the stiffening members as shown at 56a.

In its simplest form, the heating unit of the invention includes only the heating element 44, the strip 52 and the eyelets 54. Such a unit may be conveniently and simply supported within the toaster structure by means of a conducting screw extending through the end eyelets and mounting the unit to a conducting supporting member which is, in turn mounted in insulated relation on the supporting end plates. For example, in FIGS. 2 and 3, heating unit 38 is shown mounted at one end by means of conducting screw 57 extending through the end eyelet of heating unit 38 and being threadedly received in angular conducting support bracket 58 extending through opening 74 in end wall 12. Bracket 58 is supported in insulated relation on end plate 12 by means of insulator 76 and screw 78 or other suitable fastener. The other end of bracket 58 is similarly connected to heating unit 40 by conducting screw 80 extending through the end of the unit 40. Also, the bracket is further supported in insulated relation on end wall 12 by rivet 82 and insulator 84. Thus, it can be seen that the bracket serves the dual function of supporting heating units 38 and 40 and further electrically connecting the units.

Some other features and advantages of this type of heating unit are its simplicity requiring a minimum number of parts and having minimum mass and thus being relatively inexpensive. The design is also very versatile in that it is suited for use in toasters of any length, such as two slice and four slice toasters, by merely varying length of the strip and wire as desired. Another factor which reduces cost is the relatively simple manner by which the heater can be automatically fabricated.

In accordance with the method of the invention, the heating wire 44 is formed into the looped pattern shown and secured to the strip 52 with the eyelets. Preferably, these operations are performed simultaneously. First, the wire is attached to one end of the strip 52 by installing an eyelet 54 in the strip and securing the wire between the eyelet and the strip; U-shaped loop 45 is then formed in the wire. This loop is terminated and the second loop 46 started by the eyeleting operation, wherein the metal element to form an eyelet is punched into the strip; the wire is wrapped around the metal element; and the wire secured to the strip by completing the formation of the eyelet to clamp the wire between the eyelet and the strip. The loop forming and eyeleting operations are repeated until the desired heater length is obtained, and the wire is then severed. It has been found preferable to cut the insulating strips to the desired length before attaching the heating wire; however, if desired, the strip can be severed at the time the wire is cut. Since the entire operation can be mechanized and performed by a single machine, the heating unit and the method of manufacturing are particularly advantageous when large volume production is contemplated.

Although the heating unit thus far described does have many advantages, it may be utilized with reflective surfaces to obtain more efficient toasting operation. Thus, it might be desirable to either employ separate heat reflecting plates adjacent the heating units or to provide polished surfaces on the inside of the outer shell 10. Similarly, it might be desirable to incorporate a two-sided reflective surface in between the adjacent heating units of two different heating chambers. However, it is preferable that such reflective surface be as close as possible to the heating units to obtain efficient toasting operation. If the outer shell of the toaster is moved very close to the heating unit, it may become undesirably warm; whereas, utilizing separate reflector plates of course adds to the cost of the toaster. Another method to improve the efficiency of a toasting heating unit is to employ a barrier of heat insulating material adjacent the heating element. A further variation of the invention utilizes a unique heat barrier to obtain an improved low cost heating unit.

Thus, as can be seen from FIGS. 4 and 5, the heating unit further includes an upper support member 60, preferably formed of metal, suspending a thin barrier sheet 62 of heat insulating material in the area of the heating element loops. Although other materials may be employed, asbestos paper forms an excellent material for the barrier sheet 62 in that it is inexpensive and has good heat insulation characteristics. As can be seen from FIG. 5 the metallic supporting member 60 has an inverted U-shaped cross-section adapted to receive the barrier sheet 62 and includes dimples 60a for securing the sheet within the member. It is desirable that the loops of the heating element or wire 44 be maintained in surface contact with the barrier sheet 62 so that heat from the heating element is primarily directed to the adjacent bread surface. For this purpose, there is provided a strip 64 of asbestos or similar material secured to the barrier sheet at spaced intervals to form slits or loops adapted to receive the longer loops of the heating element. In the arrangement shown, staples are utilized to secure strip 64 to sheet 62; however, it should be understood that the strips may be attached by various other suitable arrangements. In this connection, it should also be recognized that the wire loops may be kept in contact with the barrier sheet 62, by other means also, e.g., by stitching with suitable heat resistant thread.

In the embodiment of the invention illustrated in the drawings, there is shown a single strip 64 of heat insulating material; however, it should be understood that more than one strip may be utilized if needed. As an alternative to utilizing an additional strip, similar to strip 64, there is provided an upper guide member 66 secured to support member 60 and overlying the upper portion of sheet 62. Guide member 66 is formed with a plurality of somewhat U-shaped slots or openings 68, each adapted to receive the upper end of the longer loops of the heating element 44, as seen in FIGS. 1 and 4. This guide member may also be made of asbestos, and it is preferable that the material be slightly thicker than the barrier sheet 62 to provide extra rigidity and strength to the unit. The guide member serves to position the upper ends of the loops and further protects the barrier sheet 62 from damage by forks or other instruments which might be improperly inserted within the toasting chamber when attempting to remove toast which may become lodged therein.

Since the guide member 66 is relatively stiff compared to the barrier sheet 62, there is some tendency for the guide member to cause bowing of the heater wires in assembly and when heated, due to added restraint when the loops are made entirely in a single plane. While it is not absolutely essential that the heater wires engage the barrier sheet 62, this is best for greatest efficiency; but if the wire does not touch at all points, we feel little efficiency is lost. The main idea is that convection currents not be allowed to circulate freely around the heater wires. Thus, to improve efficiency, the upper ends of the loops are slightly offset toward the toast chamber, as seen in FIG. 5. It should be understood, however, that when the heating unit does not include the upper support 60 and barrier sheet, it is preferable that the heating element be entirely within one plane.

Although asbestos has many desirable characteristics for use in the heating unit, as heretofore described, it may permit some leakage of electrical current when in contact with the conducting wires as used herein; and naturally, such leakage increases considerably when the asbestos absorbs moisture. Since asbestos has a relatively high capacity to absorb moisture, it is preferable that the absbestos be insulated from the toaster supporting structure. For this purpose, there is provided a strip of electrical and heat insulating material derived from mica or similar material. The insulating strip 70 is given a U-shape to fit within the support member 60, and receives the barrier sheet 62 and guide member 66.

The metallic support member 60 is provided with an integrally formed apertured tab 72 so that the upper portion of the heating unit may be attached to a supporting rib, as shown for example in FIG. 2, wherein a screw 73 connects the tab to rib 14.

The upper portion of the heating unit has many of the same advantages of the lower portion in that it utilizes the inexpensive asbestos material and lends itself to manufacturing automation methods. Also, the upper portion of the heating unit can be made in various lengths to accommodate the toaster size desired.

In assembly, the longer loops of the heating wire 44 are simply slid within the loops formed by the barrier sheet 62, strip 64, and the staples 65. The upper ends of the loops are finally inserted within the U-shaped apertures 68. It should be noted that such an arrangement allows for expansion and contraction of the heating wire loops at their temperature changes. Such expansion can take place without producing any undesirable stresses on the other components of the heating units or on the surrounding toaster structure.

As previously pointed out, electrical connections to the heating unit may be conveniently made by utilizing metallic eyelets 54. Similarly, the eyelets intermediate the end eyelets may be useful for making electrical connections pertaining to the toaster control mechanisms.

As is clear from the drawings, the heating wire 44, when positioned in the toaster, has the major portion of the loops disposed in a plane substantially parallel to and at a fixed predetermined distance from the toasting chamber 19. In other words, the heating wire may be said to form a wall of the toasting chamber. When the wire is supported at the top and bottom in a manner which tolerates expansion of the wire, the wire is permitted to expand primarily only in a plane parallel to the toasting chamber when heated.

While a particular embodiment of the invention has been shown and described, it should be understood that further modifications and variations will readily become apparent to one skilled in the art. It is intended that all such variations and modifications shall be included within the following claims insofar as they fall within the true spirit and scope of this invention.

What is claimed is:

1. In an electric toaster having a toasting chamber and a heating unit positioned adjacent the toasting chamber in heat transfer relationship with the chamber, a said heating unit forming a wall of said chamber and comprising an elongated support strip of heat and electrically insulating material, a relatively stiff resistance heating wire formed into a sinuous series of loops the major portion of which loops are disposed in a plane substantially parallel to and at a fixed predetermined distance from the toasting chamber, a plurality of metallic eyelets extending through said support strip at spaced intervals to secure one end of each loop to said strip with the major portions of said loops extending away from the strip, and means supporting said loops at the opposite end thereof at a fixed predetermined distance from the toasting chamber while permitting said heater wire to expand primarily only in a plane parallel to the toasting chamber when heated.

2. The heating unit as set forth in claim 1 wherein a U-shaped metallic reinforcing member is mounted on the lower edge of said support strip.

3. The heating unit as set forth in claim 1 wherein means extend through the end eyelets of said strip to connect the heating unit to an electrical circuit and to a supporting structure in the toaster.

4. The heating unit as set forth in claim 1 wherein said loops each include vertical portions connected by upper and lower ends and said vertical portions of alternate loops are less than half the height of adjacent loops.

5. In an electric toaster having a toasting chamber, a heating unit forming a wall of said chamber and comprising an elongated support strip of heat insulating material, a relatively stiff resistance heating wire forming a plurality of loops with the lower ends of each of the loops being securely attached by metallic outlets at spaced intervals to said support strip, a metallic stiffening member spaced from said support strip and said heating wire, a sheet of insulation material secured to said stiffening member and extending over the area of said wire loops on the opposite side of the loops from the chamber, at least one strip of heat resistant material secured to said sheet of insulation material maintain the loops of the resistance wire in close proximity with said sheet of insulation material.

6. An electric heating unit as set forth in claim 5 wherein alternate loops are less than half the height of adjacent loops.

7. The heating unit as set forth in claim 5 wherein said unit includes means for attaching said metallic stiffening member to a support structure in said toaster.

References Cited by the Examiner

UNITED STATES PATENTS

| | | | |
|---|---|---|---|
| 1,333,724 | 3/1920 | Meunier | 338—293 |
| 1,374,639 | 4/1921 | Dicks | 338—293 |
| 1,395,345 | 11/1921 | Jutton | 219—532 |
| 1,413,001 | 4/1922 | Brooks | 338—280 |
| 1,596,081 | 8/1926 | Coleman | 99—338 |
| 1,617,558 | 2/1927 | Wolcott | 99—390 |
| 2,428,900 | 10/1947 | Wiegand | 29—155.64 |
| 2,620,426 | 12/1952 | Gustafson | 99—389 X |
| 2,778,912 | 1/1957 | Palmer et al. | 219—553 X |
| 3,002,075 | 9/1961 | Visos | 219—532 |
| 3,050,833 | 8/1962 | Schwing | 29—155.64 |
| 3,136,885 | 6/1964 | Hynes | 338—280 X |
| 3,169,469 | 2/1965 | Parr | 99—400 |

RICHARD M. WOOD, *Primary Examiner.*

ANTHONY BARTIS, *Examiner.*

V. Y. MAYEWSKY, *Assistant Examiner.*